US010098183B2

(12) United States Patent
Bohlender et al.

(10) Patent No.: US 10,098,183 B2
(45) Date of Patent: Oct. 9, 2018

(54) ELECTRIC HEATING DEVICE

(71) Applicant: Eberspacher catem GmbH & Co. KG, Herxheim (DE)

(72) Inventors: Franz Bohlender, Kandel (DE); Patrick Kachelhoffer, Seebach (FR); Michael Niederer, Kapellen-Drusweiler (DE); Andreas Schwarzer, Frankfurt am Main (DE); Kurt Walz, Hagenbach (DE)

(73) Assignee: Eberspacher catem GmbH & Co. KG, Herxheim (DE)

( * ) Notice: Subject to any disclaimer, the term of this patent is extended or adjusted under 35 U.S.C. 154(b) by 128 days.

(21) Appl. No.: 15/169,833

(22) Filed: Jun. 1, 2016

(65) Prior Publication Data

US 2016/0360574 A1 Dec. 8, 2016

(30) Foreign Application Priority Data

Jun. 2, 2015 (EP) .................................... 15170331

(51) Int. Cl.

| | |
|---|---|
| ***H05B 3/08*** | (2006.01) |
| ***H05B 3/18*** | (2006.01) |
| ***B60H 1/22*** | (2006.01) |
| ***F24H 1/00*** | (2006.01) |
| ***F24H 1/12*** | (2006.01) |

(Continued)

(52) U.S. Cl.

CPC ............. *H05B 3/18* (2013.01); *B60H 1/2215* (2013.01); *F24H 1/009* (2013.01); *F24H 1/121* (2013.01); *F24H 3/0458* (2013.01); *F24H 9/1827* (2013.01); *H05B 3/04* (2013.01); *H05B 3/06* (2013.01); *H05B 3/50* (2013.01);

(Continued)

(58) Field of Classification Search

CPC ... H05B 3/18; H05B 3/04; H05B 3/06; H05B 3/50; H05B 2203/02; H05B 2203/023; F24H 3/0447; F24H 1/009; F24H 1/121; F24H 9/1827; F24H 2250/04; B60H 1/2215

See application file for complete search history.

(56) References Cited

U.S. PATENT DOCUMENTS

| | | | |
|---|---|---|---|
| 4,327,282 A | | 4/1982 | Nauerth |
| 4,371,777 A | | 2/1983 | Roller et al. |

(Continued)

FOREIGN PATENT DOCUMENTS

| | | | |
|---|---|---|---|
| EP | 1 921 896 B1 | | 5/2008 |
| EP | 1921896 | * | 5/2008 |

*Primary Examiner* — Shawntina Fuqua

(74) *Attorney, Agent, or Firm* — Boyle Fredrickson, S.C.

(57) ABSTRACT

An electric heating device including a heater housing in which a partition separates a circulation chamber, through which a medium to be heated can flow, from a connection chamber in which electrical connections of a PTC heating element introduced into a recess of a heating rib projecting from the partition into the circulation chamber are exposed. The PTC heating element has at least one PTC element and strip conductors lying against it at both sides, of which at least one strip conductor is covered by an electrical insulation layer. To create an electric heating device which permits a delivery of heat of the PTC heating element to the environment in an improved way, the heating rib is formed by a heating rib frame which comprises at least one window in which the insulation layer is exposed.

20 Claims, 4 Drawing Sheets

(51) Int. Cl.

| | |
|---|---|
| ***F24H 9/18*** | (2006.01) |
| ***H05B 3/06*** | (2006.01) |
| ***H05B 3/04*** | (2006.01) |
| ***H05B 3/50*** | (2006.01) |
| *F24H 3/04* | (2006.01) |

(52) U.S. Cl.
CPC ........ *F24H 3/0447* (2013.01); *F24H 2250/04* (2013.01); *H05B 2203/02* (2013.01); *H05B 2203/023* (2013.01)

(56) References Cited

U.S. PATENT DOCUMENTS

| | | | |
|---|---|---|---|
| 2007/0068927 | A1 | 3/2007 | Bohlender et al. |
| 2008/0099464 | A1 | 5/2008 | Niederer et al. |

* cited by examiner

ELECTRIC HEATING DEVICE

BACKGROUND OF THE INVENTION

1. Field of the Invention

The present invention refers to an electric heating device comprising a heater housing in which a partition separates a circulation chamber, through which a medium to be heated can flow, from a connection chamber in which electrical connections of a PTC heating element introduced into a recess of a heating rib projecting from the partition into the circulation chamber are exposed, wherein the PTC heating element has at least one PTC element and strip conductors lying against it at both sides, of which at least one strip conductor is covered with an electrical insulation layer.

Such an electric heating device is e.g. known from EP 1 921 896 A1.

2. Description of the Related Art

Electric heating devices of the above-mentioned type are above all used in automotive vehicles. This includes the possibility of installing an electric heating device of such a type in an electrically driven automotive vehicle. Such automotive vehicles have an electrical system voltage different from that of automotive vehicles driven by internal combustion engines, for which an internal power supply of 12 V is enough.

Thus, there is an increasing demand for offering electric heating devices used for automotive vehicles, which are configured to be electrically insulating particularly with respect to the environment. Due to the self-regulating properties of the PTC elements this demand is diametrically opposed to the requirement to allow the PTC element to be impinged as freely as possible by the medium to be heated so as to dissipate as best as possible the heat generated by the PTC element and thus to exploit as best as possible the performance of the PTC element.

SUMMARY OF THE INVENTION

The present invention wants to create an electric heating device handling these contradictory requirements as best as possible.

For the solution the present invention suggests that the heating rib is provided with a heating rib frame which comprises at least one window. The window thus forms a penetration between the interior of the heating rib frame serving the accommodation of the PTC heating element, and the exterior surface against which the medium to be heated normally flows. According to the invention the insulation layer is exposed in this window so that the heat generated by the PTC element has just to be passed through the strip conductor and through the insulation layer before said heat can be dissipated by way of convection on the surface of the electrical insulation layer. The heat conduction paths are shortened accordingly. The electrical performance of the FTC element can thereby be exploited in the best way possible.

The heating rib frame is preferably made from a material of good thermal conductivity. It may be formed from metal or a heat-conducting plastic improved by way of thermally conductive fillers. The heating rib frame encloses the PTC heating element, so that the FTC element is safely housed with respect to the environment. The exterior surfaces of the heating ribs that are exposed in the circulation chamber are thus exclusively formed either by the heating rib frame or by the exterior surface of the insulation layer.

According to a preferred development of the present invention the electrical insulation layer is glued into the heating rib frame. It is true that the insulation layer is exposed in the window. Nevertheless, an overlapping portion between the electrical insulation layer and the surfaces of the heating rib frame accommodates a sealant, normally a sealing adhesive through which the electrical insulation layer is connected to the heating rib frame so that the recess surrounded by the frame is sealed towards the environment. Alternatively or in addition, the surrounding front face surfaces of the electrical insulation layer are received in an electrically insulating mass. The electrical insulation layer is thereby also sealed in the heating rib frame. The mass is preferably a mass which ensures a tight connection between the heating element and the heating rib frame. This mass may particularly be silicone, specifically an addition-curing 2-component silicone which cures at room temperature and cures in a forced way under heat. In the cross linked state the component of the mass that forms the liquid phase should have a Shore A hardness of about 10-40 and/or a dielectric strength CTI>600.

With a view to a heat delivery that is as symmetrical as possible, it is suggested according to a preferred development of the present invention that the heating rib frame is provided with two opposite windows in which an electrical insulation layer is respectively exposed, which covers an associated strip conductor. The window(s) is (are) preferably formed by frame legs of the heating rib frame that extend in parallel with the electrical insulation layers. The insulation layer lies preferably on the inside against these frame legs. The insulation layer with its outer surface lies on the frame legs accordingly. The frame legs can surround the insulation layer on the outer circumference. The aforementioned mass is preferably provided between the PTC heating element and inner walls of the recess and is preferably configured to be electrically insulating. With a view to good processability and the filling of free spaces within the heating rib frame, the viscosity should be between 5 and 8 Pa s. This viscosity value and also all of the viscosity values discussed herein are determined at 25° C.

The mass has a dielectric strength CTI>600. Air gaps and creep distances are particularly reliably avoided if a free space within the heating rib frame is completely filled with the mass. This free space is each time formed in width direction between the insulation layer and in the direction of the longitudinal extension of the heating rib between the PTC element and a front face of the heating rib frame provided opposite thereto. The strip conductors should here in principle end flush with the PTC elements, i.e. they should at any rate not project beyond the PTC elements circumferentially, and it goes without saying that the strip conductors are extended at least towards the connection chamber beyond the PTC element. However, it should here also be avoided that the strip conductors are provided over an air gap in freely opposing manner. Thus, mass which surrounds the PTC element on the front side should also be introduced towards the connection chamber between the strip conductors. The PTC element is thus sealed by the mass preferably over the whole circumference.

The filling of the previously mentioned free space improves tightness. As has been mentioned above, the mass is provided to surround the PTC element preferably circumferentially, with the strip conductors being arranged at a distance from the heating rib frame to impede an electrical flashover from the strip conductors to the heating rib frame. Each air gap is preferably filled by mass which receives the strip conductor at the front side, preferably fills any free space between the FTC heating element and the opposite inner surfaces of the heating rib frame.

The previously mentioned electric heating device may be an electric heating device for air heating, as is e.g. described in EP 1 768 458 A1. In such an air heater, corrugated rib layers lie against the insulation layers on the outside. The above-discussed development with a mass of good thermal conductivity in the free spaces between the PTC element and the heating rib frame, however, improves heat discharge at the place where the heat is discharged not only through corrugated rib layers on the main side surfaces of the PTC element, but also on surfaces at a right angle thereto, i.e. the side edges of the heating rib. Corrugated rib layers may be provided on said side edges, on condition that the heat is delivered to a gaseous medium. These may also be omitted, so that the electric heating device of the present invention offers its advantages with a relatively simple design also in cases where the heating rib projects into a circulation chamber that is fitted to receive a liquid medium. To this end the circulation chamber is sealed against the environment and comprises at least one inlet and at least one outlet nozzle for the connection of the circulation chamber to a circuit for the liquid medium. This circuit is e.g. a circuit for heating at least one unit in an automotive vehicle, e.g. for heating a battery for the power current of the drive and/or for heating the interior of the vehicle. The circuit thus preferably comprises a heat exchanger which is flown at by a fan which sucks in air and blows it into the interior of the vehicle. In such a fluid heater the recess is U-shaped and has an opening suited for insertion of the FTC element into the recess. The PTC element is first prepared normally as a prefabricated PTC heating cell together with the strip conductors and then inserted into the recess. The strip conductors are normally formed by contact sheets, so that the FTC element is mechanically stabilized by the metal sheets glued thereto. The U-shaped recess opens towards the connection chamber so that the connecting lugs of the contact sheets which are normally formed by punching and free cutting are extended into the connection chamber and are there exposed for the electrical connection of the PTC element.

According to a preferred development of the present invention the heating rib is exposed over the whole circumference in the circulation chamber, so that the heat can also be delivered via the side edges and via the bottom to the liquid medium to be heated.

According to a preferred development of the present invention the partition with the heating rib frame is made of a highly heat-resistant plastic having a high stability at high temperatures. The partition together with the heating rib frame can be formed as a unit. The partition can also be formed by a plurality of individual heating rib elements, each as such forming a heating rib frame and a section of a partition which separates the connection chamber from the circulation chamber. Such heating rib elements can be inserted into a frame-like housing cover and sealingly connected thereto. Highly heat-resistant or temperature stable plastics in the sense of this development are particularly PA, PS or PPS. At any rate a highly heat-resistant thermoplastic should be preferred.

BRIEF DESCRIPTION OF THE DRAWINGS

Further details of the present invention become apparent from the following description of an embodiment in combination with the drawing, in which.

DETAILED DESCRIPTION

Figure 1:
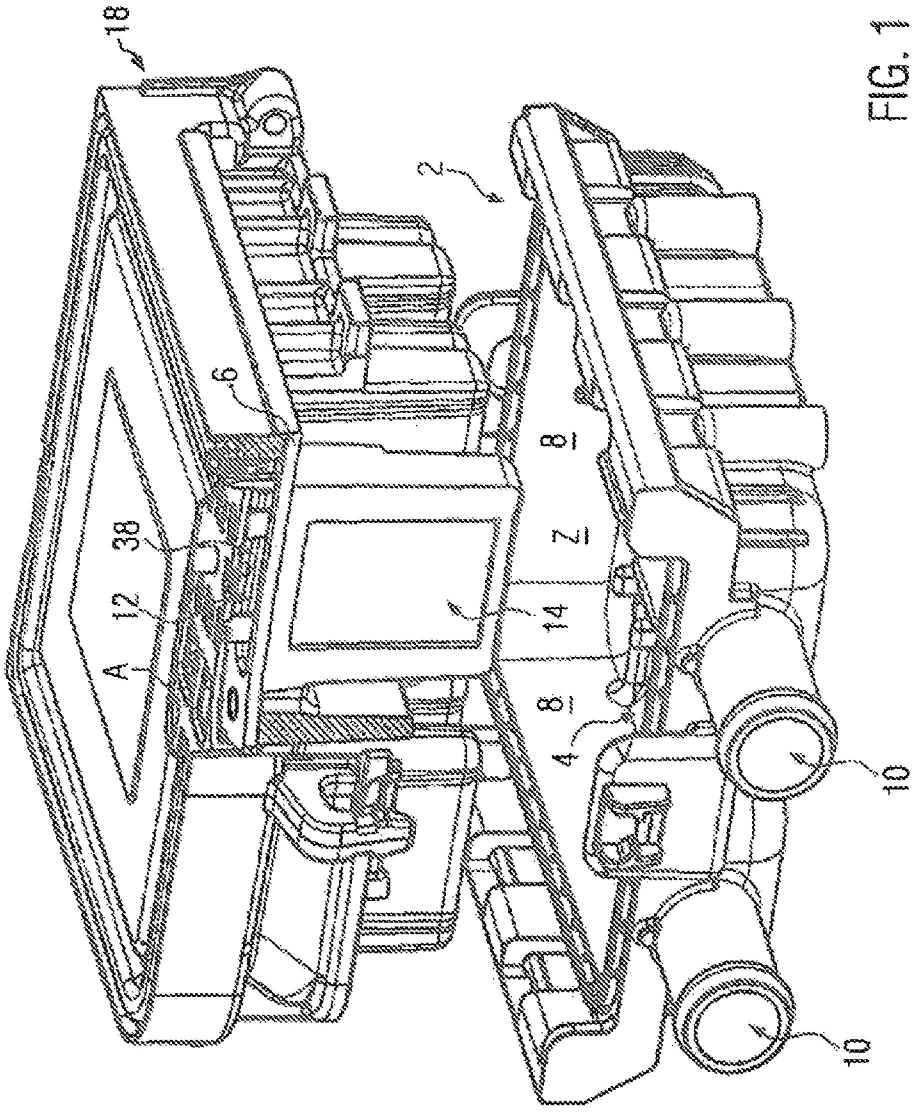
FIG. 1 is a perspective, partly cut, exploded view of an embodiment of an electric heating device.
Figure 2:
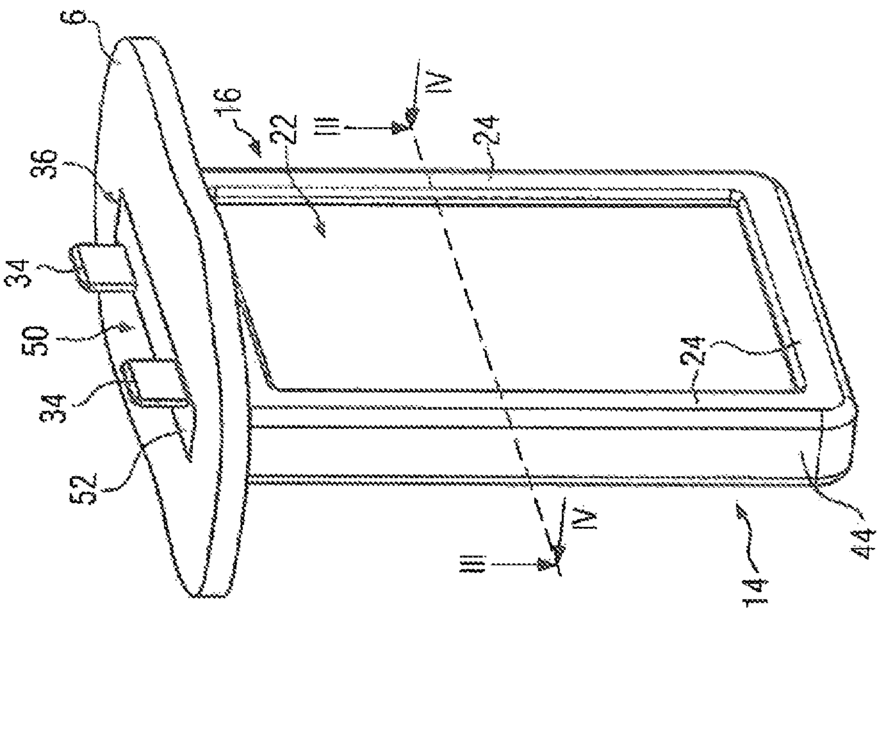
FIG. 2 is a perspective view of a heating rib with parts of a partition.

FIGS. 1 and 2 show parts of an electric heating device, as is e.g. known from EP 1 921 896 A1, the disclosure of which is herewith included in the content of the present application. The electric heating device has a tub-shaped housing base 2 which encloses a circulation chamber Z between a housing bottom 4, a partition 6 extending in parallel therewith and housing sidewalls 8 extending at a right angle thereto. Connection nozzles 10 project from opposite sidewalls 8 of the housing base 2 for connection of the electric heating device to a circuit for a liquid medium. Said connection nozzles 10 are sealingly connected to the housing sidewalls 8. The housing base 2 may be formed of plastic. The circulation chamber is made fluid-tight.

The filling volume of the circulation chamber in water heaters of the above-described type is between 450 ml and 200 ml, preferably between 400 ml and 220 ml, and particularly preferably between 300 ml and 230 ml. This filling volume also comprises the filling volume of the nozzle. Each nozzle as such has a filling volume of about 7 ml. The illustrated embodiment is normally integrated in a cooling water circuit in a vehicle which has a volume of about 3 to 6 liters. At least one heat exchanger for heating air in the passenger compartment can be integrated into this cooling water circuit. In addition or alternatively, the cooling water circuit may also have heat exchanger surfaces for technical components of an electric vehicle to give these the necessary operating temperature in case of cold ambient temperatures.

The partition 6 separates the previously mentioned circulation chamber Z from a connection chamber A, which serves the electrical connection of PTC heating elements 12 in the way to be described later. Heating ribs 14 project from the partition 6 into the circulation chamber Z. The heating ribs 14 extend at a right angle from the partition 6.

Figure 3:
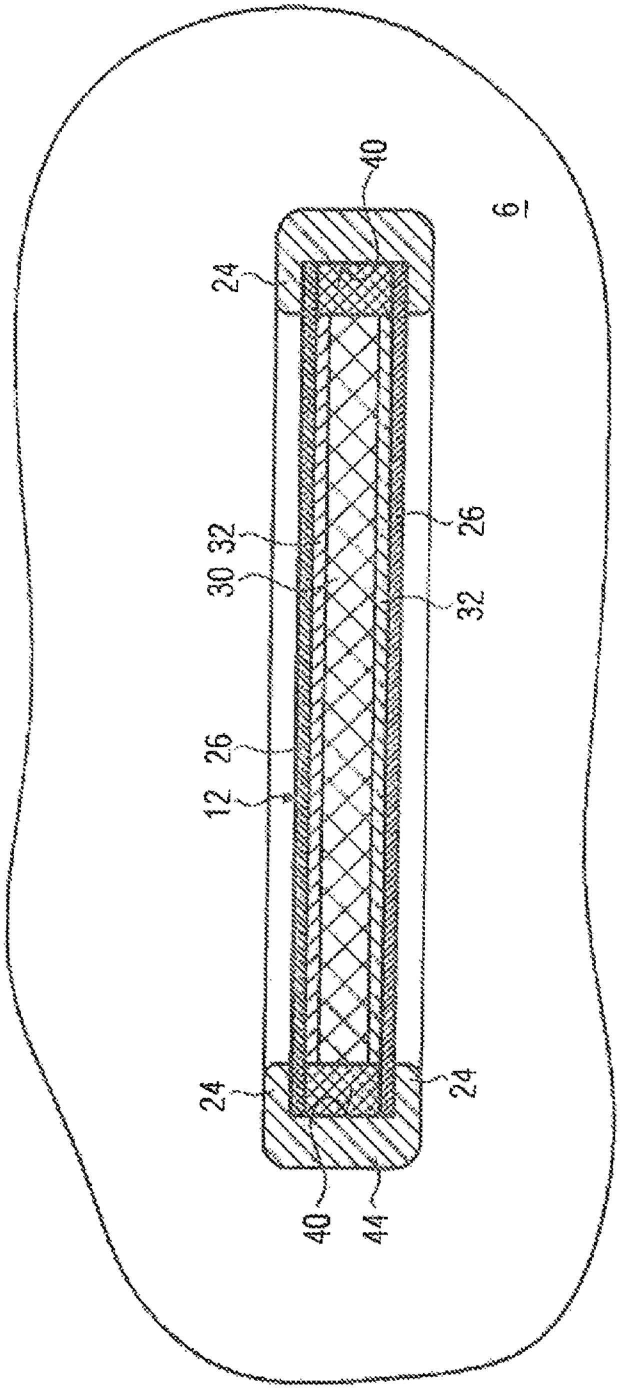
FIG. 3 is a longitudinal sectional view through the heating rib according to FIGS. 1 and 2 along line IV-IV according to the illustration in FIG. 2.
Figure 4:
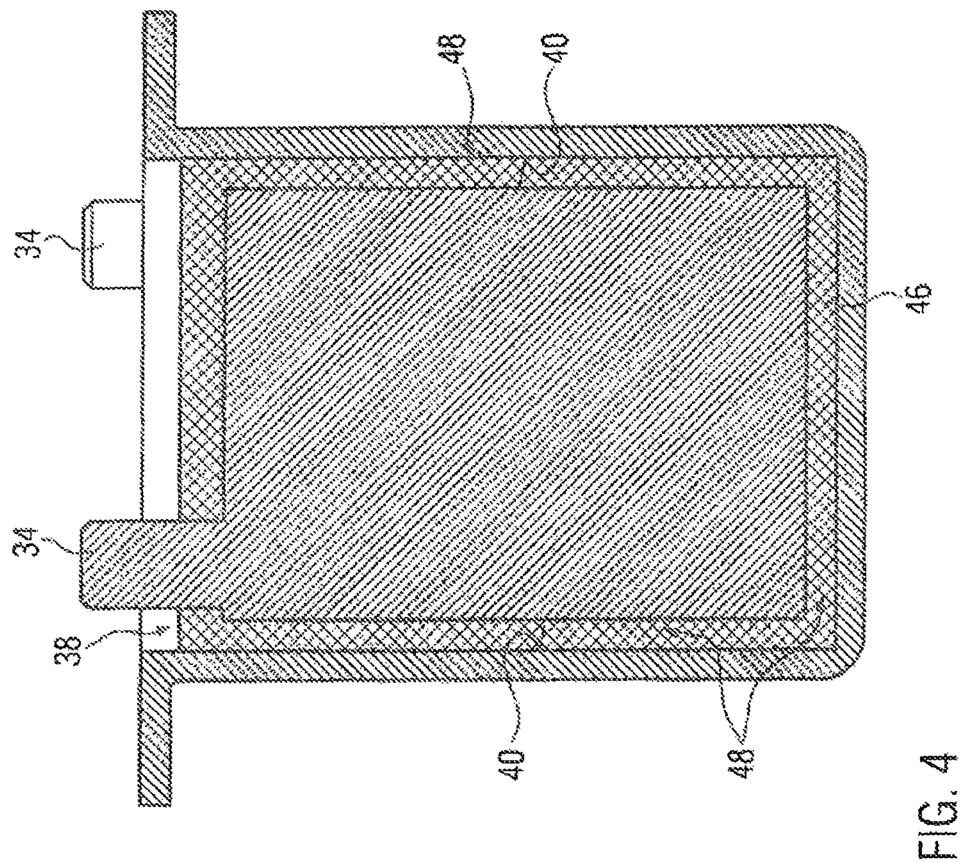
FIG. 4 is a longitudinal sectional view along line V-V according to the illustration in FIG. 2.

FIGS. 2 to 4 illustrate details of these heating ribs 14.

The heating ribs 14 have a heating rib frame 16 which is connected to the partition 6. The heating rib frame 16 is made from a high temperature-resistant material of a preferably good thermal conductivity, e.g. metal, particularly sheet metal, or however plastic. A thermoplastic is to be preferred to which thermally conductive particles have been added to enhance the thermal conductivity. The heating rib frame 16 is connected to the partition 6. The partition 6 and thus the housing base 2 may be made of plastic. This is also applicable to a housing top marked with reference numeral 18 in FIG. 1, which covers the connection chamber A at the top side as a housing cover. Thus the illustrated embodiment of an electric heating device can be produced at low costs and simply predominantly by the injection molding of plastics.

The heating rib frame 16 has a respective window 22 at two opposite main side surfaces 20. Each window is confined by four frame legs 24, each extending at a right angle to one another. The frame legs 24 are integrally formed on the heating rib frame 16 and extend in parallel with the main opening of the window 22. An insulation layer 26 which is here formed by an aluminum oxide plate is visible in the window 22.

As illustrated by FIGS. 3 and 4, two insulation layers 26 adjoin the outside of the FTC heating element 12 which in the present case comprises a single PTC element 30 and contact sheets 32 adjoining the same at both sides, which form strip conductors within the meaning of the present invention. The contact sheets 32 are cut free at the end side and form connecting lugs 34 integrally formed on the contact sheets 32 for the electrical connection of the FTC heating element 28. The contact sheets 32 are glued to the PTC element 30. As can further be seen in FIGS. 4 and 5, the contact sheets 32 project, just with their connecting lugs 34, over the FTC element 30 circumferentially. Otherwise, the contact sheets 32 end flush with the outer circumferential surface of the PTC element 30. By contrast, the insulation layers 26 project over the FTC element 30 on all sides.

Figure 5:
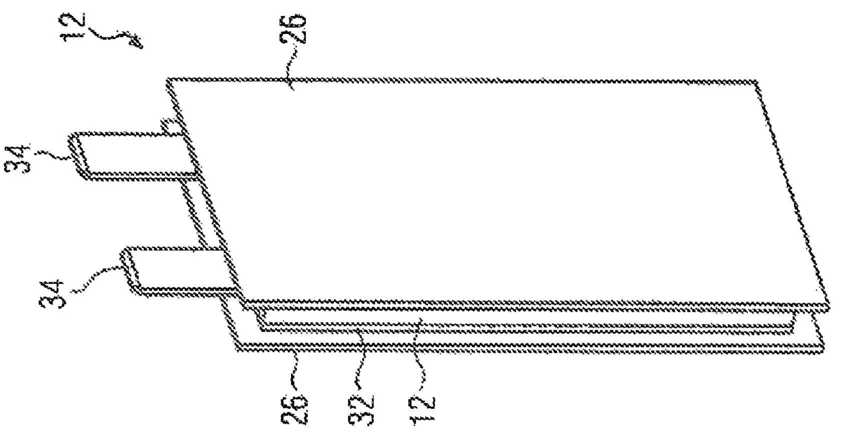
FIG. 5 shows the PTC heating element with adjoining electrical insulation layers of the embodiment.

The heating rib frame 16 is fitted for the accommodation of the embodiment of the PTC heating element 12 as shown in FIG. 5. For instance, a U-shaped recess 38 of the heating rib frame 16 which opens towards the connection chamber A via an insertion opening 36 recessed in the partition 6 is dimensioned such that the insulation layers 26 just fit into the recess 38. The insulation layers 26 thereby serve as spacers to keep the PTC element 30 and the contact sheets 32, which are adhesively bonded thereto, at a distance from the front faces 40 which are formed by the heating rib frame 16 and interconnect main sidewalls in which the windows 22 and the insulation layers 26 are located.

Normally, the housing parts 2, 18 are first U-shaped, for instance by plastic injection molding. The heating rib frame 26 can here be connected to the housing base 2 by overmolding. The housing bottom is here normally produced as a separate component and subsequently connected to the housing sidewalls 8. The FTC heating elements are afterwards introduced with the insulation layers 26, previously glued thereto, as an intermediate product into the U-shaped recess 38. With this way of positioning, free spaces 48 are obtained between the FTC element 30 and the front faces 40 both on the side edges, marked with reference numeral 44, of the heating rib frame 16 and on sides of a bottom 46 of the heating rib frame 16. The free spaces 48 form a U-shaped continuum which communicates with an upper free space 50, which is partly penetrated by the connecting lugs 34. A mass of good thermal conductivity which is electrically insulating is now filled in through the insertion opening 36. The free spaces 48, 50 are thereby filled. The PTC element 30 is now coupled in a heat-conducting manner also to the respectively opposite front faces 40 of the heating rib frame 16. Casting mass is filled in to such an extent that it is at about the same level as the upper edges of the insulation layer 26. This state is illustrated in FIGS. 2 and 4, the casting mass being marked with reference numeral 52. Thus, all creep distances and air gaps between the contact sheets 32 of different polarity are filled by said mass 52. The PTC heating element is thereby received in a highly insulating manner in the heating rib 14. The insulation layers 26 extend almost up to the front faces 40 and enclose the casting mass 52 thereinbetween. The casting mass cross-links at ambient temperature and sets accordingly. The cross-linking of the two-component mass 52 can be accelerated by powering and thereby heating the PTC heating element 12 during production.

As is particularly illustrated in FIGS. 2 and 3, the heating rib 14 is exposed over the whole circumference in the circulation chamber. It goes without saying that the heating rib 14 is the part that projects from the partition 6. Thus, the one side surface of the heating rib 14 lies in the circulation chamber against the partition 6 also in the case of a "fully circumferential" exposure in the sense of the present invention. The electrical insulation layer 26 sealingly abuts an inner side of the heating rib frame 16. Thus the electrical insulation layer 26 closes the window 22 at the inner side of the heating rib frame 16.

What is claimed is:

1. An electric heating device, comprising:

a heater housing in which a partition separates a circulation chamber, through which a medium to be heated can flow, from a connection chamber in which electrical connections of a PTC heating element are exposed, wherein the PTC heating element has at least one PTC element and strip conductors lying against opposed sides of the PTC element, wherein at least one of the strip conductors is covered by an electrical insulation layer, wherein the PTC heating element is introduced into a recess which is provided in a heating rib projecting from the partition into the circulation chamber, wherein the heating rib comprises a heating rib frame with at least one window in which the insulation layer is exposed to said medium, and wherein the heating rib frame of the heating rib is connected to the partition.

2. The electric heating device according to claim 1, wherein the electrical insulation layer sealingly abuts an inner side of the heating rib frame.

3. The electric heating device according to claim 1, wherein the electrical insulation layer is glued into the heating rib frame.

4. The electric heating device according to claim 1, wherein the heating rib frame forms two opposite windows in which one of the electrical insulation layers is respectively exposed, and wherein each strip conductor is respectively covered by an electrical insulation layer.

5. The electric heating device according to claim 1, wherein the heating rib frame comprises frame legs extending in parallel with the electrical insulation layer, against which the insulation layer lies circumferentially, and wherein a mass, by which the electrical insulation layer is sealed into the heating rib frame, is provided between the PTC heating element and inner walls of the recess.

6. The electric heating device according to claim 5, wherein a free space, which is provided between the insulation layers on the one hand and the PTC element and a front face of the heating rib frame provided opposite thereto on the other hand, is filled with the mass.

7. The electric heating device according to claim 5, wherein an upper free space, which is provided between the PTC element and the partition, is filled with the mass.

8. The electric heating device according to claim 5, wherein the mass surrounds the PTC element circumferentially.

9. The electric heating device according to claim 5, wherein the strip conductor is provided at a distance from the heating rib frame and is received on a front side in the mass.

10. The electric heating device according to claim 1, wherein the recess is U-shaped and opens for insertion of the PTC heating element towards the connection chamber, and wherein the circulation chamber is fitted to receive a liquid medium is sealed, and is provided with an inlet and an outlet nozzle for connection of the circulation chamber to a circuit for the liquid medium.

11. The electric heating device according to claim 10, wherein the heating rib is exposed over an entire circumference thereof in the circulation chamber.

12. The electric heating device according to claim 10, wherein the partition with the heating rib frame is made from a highly heat-resistance plastic.

13. The electric heating device according to claim 1, wherein the recess is U-shaped and opens for insertion of the PTC heating element towards the connection chamber, and wherein the circulation chamber is fitted to receive a liquid medium is sealed, and is provided with an inlet and an outlet nozzle for connection of the circulation chamber to a circuit for the liquid medium, wherein the heating rib is exposed over an entire circumference thereof in the circulation chamber.

14. The electric heating device according to claim 13, wherein the partition with the heating rib frame is made from a highly heat-resistance plastic.

15. An electric heating device, comprising:

a heater housing in which a partition separates a circulation chamber, through which a medium to be heated can flow, from a connection chamber in which electrical connections of a PTC heating element are exposed, wherein the PTC heating element has at least one PTC element and strip conductors lying against opposed sides of the PTC element, wherein at least one of the strip conductors is covered by an electrical insulation layer, wherein the PTC heating element is introduced into a recess which is provided in a heating rib projecting from the partition into the circulation chamber, wherein the heating rib comprises a heating rib frame with at least one window in which the insulation layer is exposed to said medium, wherein the heating rib frame of the heating rib is connected to the partition, wherein the heating rib frame forms two opposite windows in which one of the electrical insulation layers is respectively exposed, and wherein each strip conductor is respectively covered by an electrical insulation layer.

16. The electric heating device according to claim 15, wherein the recess is U-shaped and opens for insertion of the PTC heating element towards the connection chamber, and wherein the circulation chamber is fitted to receive a liquid medium is sealed, and is provided with an inlet and an outlet nozzle for connection of the circulation chamber to a circuit for the liquid medium.

17. The electric heating device according to claim 16, wherein the heating rib is exposed over an entire circumference thereof in the circulation chamber and wherein the partition with the heating rib frame is made from a highly heat-resistance plastic.

18. An electric heating device, comprising:

a heater housing in which a partition separates a circulation chamber, through which a medium to be heated can flow, from a connection chamber in which electrical connections of a PTC heating element are exposed, wherein the PTC heating element has at least one PTC element and strip conductors lying against opposed sides of the PTC element, wherein at least one of the strip conductors is covered by an electrical insulation layer, wherein the PTC heating element is introduced into a recess which is provided in a heating rib projecting from the partition into the circulation chamber, wherein the heating rib comprises a heating rib frame with at least one window in which the insulation layer is exposed to said medium, wherein the heating rib frame of the heating rib is connected to the partition, wherein the heating rib frame comprises frame legs extending in parallel with the electrical insulation layer, against which the insulation layer lies circumferentially, and wherein a mass, by which the electrical insulation layer is sealed into the heating rib frame, is provided between the PTC heating element and inner walls of the recess.

19. The electric heating device according to claim 18, wherein the mass surrounds the PTC element circumferentially.

20. The electric heating device according to claim 18, wherein the strip conductor is provided at a distance from the heating rib frame and is received on a front side in the mass.

* * * * *